US010414347B2

(12) United States Patent
Wilbert et al.

(10) Patent No.: US 10,414,347 B2
(45) Date of Patent: Sep. 17, 2019

(54) ROAD SIGN ANNOUNCER

(71) Applicant: Panasonic Automotive Systems Company of America, Division of Panasonic Corporation of North America, Peachtree City, GA (US)

(72) Inventors: Katherine Wilbert, Northville, MI (US); Maria Rohrer, Bloomfield, MI (US); Garrett Laskowski, Fenton, MI (US); John Qiu, Northville, MI (US); Padmanaban Kanagaraj, Farmington Hills, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 158 days.

(21) Appl. No.: 15/409,824

(22) Filed: Jan. 19, 2017

(65) Prior Publication Data
US 2017/0206887 A1    Jul. 20, 2017

Related U.S. Application Data

(60) Provisional application No. 62/280,436, filed on Jan. 19, 2016.

(51) Int. Cl.
*B60Q 5/00* (2006.01)
*G06K 9/00* (2006.01)
*G06K 9/32* (2006.01)
*B60R 11/04* (2006.01)
*G10L 13/00* (2006.01)

(52) U.S. Cl.
CPC .............. *B60R 11/04* (2013.01); *B60Q 5/005* (2013.01); *G06K 9/00818* (2013.01); *G06K 9/3258* (2013.01); *G10L 13/00* (2013.01); *G06K 2209/01* (2013.01)

(58) Field of Classification Search
CPC .......................... G10L 13/00; G06K 9/00818; G06K 2209/01; G06K 9/3258; B60Q 5/005; B60R 11/04
See application file for complete search history.

(56) References Cited

U.S. PATENT DOCUMENTS

| 2002/0051575 | A1* | 5/2002 | Myers | G06K 9/3258 382/202 |
| 2005/0180632 | A1* | 8/2005 | Aradhye | G06K 9/3258 382/182 |
| 2014/0111647 | A1* | 4/2014 | Atsmon | H04N 7/185 348/148 |
| 2014/0309864 | A1* | 10/2014 | Ricci | H04W 4/21 701/36 |
| 2016/0351051 | A1* | 12/2016 | Murthy | G06K 9/00818 |

* cited by examiner

*Primary Examiner* — Vincent Rudolph
*Assistant Examiner* — Pinalben Patel
(74) *Attorney, Agent, or Firm* — Laurence S. Roach, Esq.

(57) ABSTRACT

A vehicle includes a camera capturing an image of a road sign associated with a road that the vehicle is traveling on. A first processing device is communicatively coupled to the camera and recognizes text characters in the captured image. A second processing device is communicatively coupled to the first processing device and converts the recognized text characters into an electronic speech signal. A loudspeaker is communicatively coupled to the second processing device and converts the electronic speech signal into audible speech that can be heard by the driver of the vehicle.

9 Claims, 4 Drawing Sheets

ROAD SIGN ANNOUNCER

CROSS-REFERENCED TO RELATED APPLICATIONS

This application claims benefit of U.S. Provisional Application No. 62/280,436 filed on Jan. 19, 2016, which the disclosure of which is hereby incorporated by reference in its entirety for all purposes.

FIELD OF THE INVENTION

The disclosure relates to the field of automotive information systems, and, more particularly, to automotive information systems that provide road information to the driver.

BACKGROUND OF THE INVENTION

Reading road signs while still watching the road is a difficult task for a driver, particularly at highway speed and high traffic situations. It is known to display the road sign information on the instrument cluster or head up display (HUD). However, this also requires the driver to use his eyes for reading rather than watching the road.

SUMMARY

The present invention may capture images of nearby road signs and read the signs out loud to the driver through the vehicle's built-in sound system. The invention may interpret the text of the signs in real time and convert the text to speech in the form of a synthesized voice. Alternatively, the invention may detect the road signs and play previously made recordings of readings of each sign from a database instead of interpreting the text of the signs in real time and converting the text to speech in the form of a synthesized voice.

The invention may read road signs and translate the road signs into another language, such as the native language of the driver.

In one embodiment, the invention comprises a vehicle including a camera capturing an image of a road sign associated with a road that the vehicle is traveling on. A first processing device is communicatively coupled to the camera and recognizes text characters in the captured image. A second processing device is communicatively coupled to the first processing device and converts the recognized text characters into an electronic speech signal. A loudspeaker is communicatively coupled to the second processing device and converts the electronic speech signal into audible speech that can be heard by the driver of the vehicle.

In another embodiment, the invention comprises a vehicle including a geographical positioning system determining a geographical location of the vehicle. A first processing device is communicatively coupled to the geographical positioning system and wirelessly transmits the geographical location of the vehicle to an external database. The first processing device wirelessly receives from the external database a textual message associated with a road sign that is visible to a driver of the vehicle at the geographical location of the vehicle. A second processing device is communicatively coupled to the first processing device and converts the textual message from the external database into an electronic speech signal. A loudspeaker is communicatively coupled to the second processing device and converts the electronic speech signal into audible speech that can be heard by the driver of the vehicle.

In yet another embodiment, the invention comprises a vehicle including a a camera capturing an image of a road sign associated with a road that the vehicle is traveling on. A first processing device is communicatively coupled to the camera and recognizes text characters in the captured image. A geographical positioning system determines a geographical location of the vehicle. A second processing device is communicatively coupled to the geographical positioning system and wirelessly transmits the geographical location of the vehicle to an external database. The second processing device wirelessly receives from the external database a textual message associated with a road sign that is visible to a driver of the vehicle at the geographical location of the vehicle. A third processing device is communicatively coupled to each of the first processing device and the second processing device and produces a confidence score indicative of a likelihood that the textual message from the database is associated with the road sign in the image captured by the camera. A fourth processing device is communicatively coupled to the third processing device and converts the textual message from the external database into an electronic speech signal only if the confidence score exceeds a threshold. A loudspeaker is communicatively coupled to the fourth processing device and converts the electronic speech signal into audible speech that can be heard by the driver of the vehicle.

The present invention has the advantage that the driver can keep his eyes on the road without having to deviate his gaze to read road signs.

Another advantage is that the driver may be enabled to process all signs along the road.

Yet another advantage is that, by providing auditory assist, the invention provides fewer distracting visual stimuli and can help those who are visually impaired.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
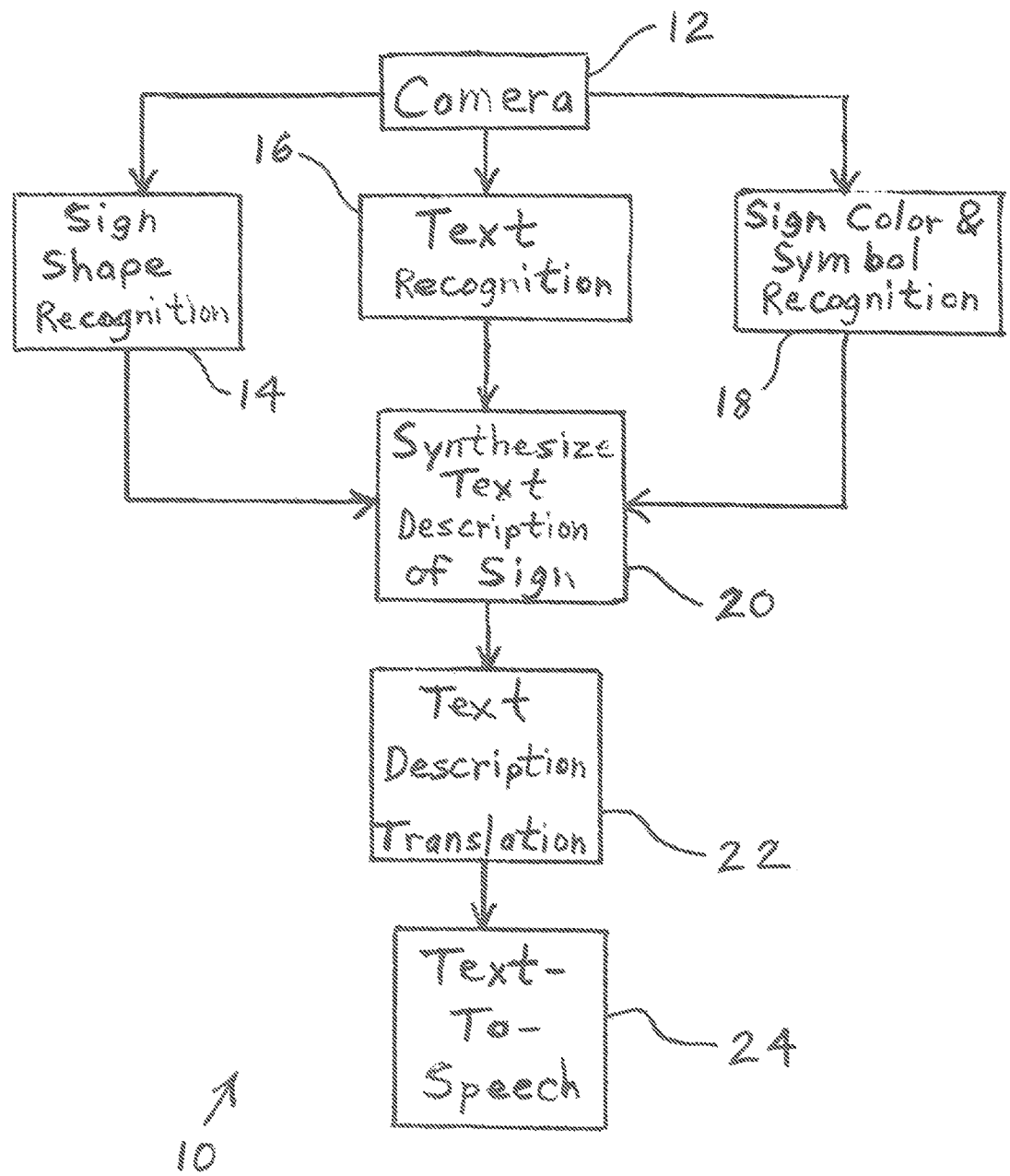
FIG. 1 is a block diagram of one embodiment of a road sign announcing arrangement of the present invention.

FIG. 1 illustrates one embodiment of a road sign announcing arrangement 10 of the present invention disposed in a vehicle, and including a camera 12, a sign shape recognition module 14, a text recognition module 16, a sign color and symbol recognition module 18, a text synthesization module 20, a text translation module 22, and a text-to-speech module 24.

Camera 12 may be mounted on the front of the vehicle, and may capture images within its field of view along the roadside and/or above the road that the vehicle is traveling on. In one embodiment, two cameras are provided. One of the cameras is directed to the right of and slightly above the vehicle along the roadside, and the other camera is directed straight ahead of and above the vehicle. Thus, the cameras are pointed in directions where road signs are typically posted.

Figure 2:
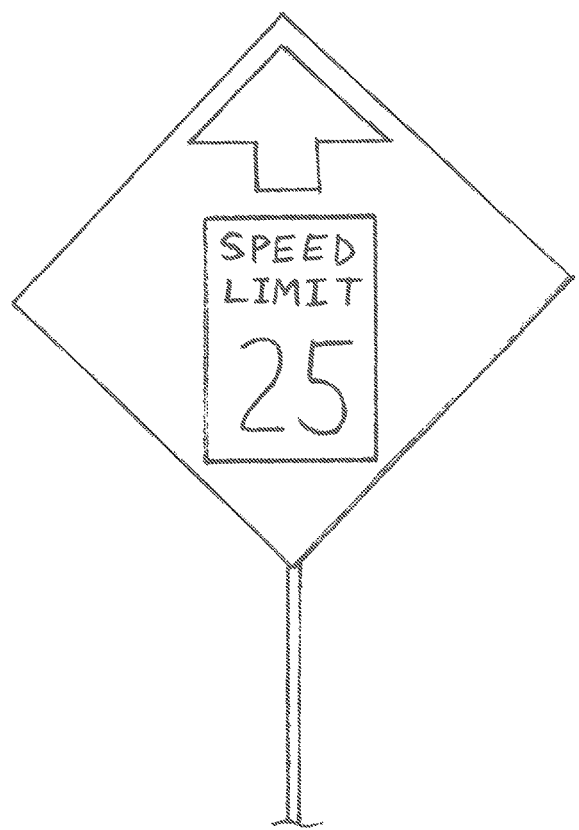
FIG. 2 is a plan view of a road sign that may be read by the road sign announcing arrangement of FIG. 1.

Sign shape recognition module 14 may recognize the shape of the sign in the images captured by the camera and determine therefrom the type of sign it is. For example, a diamond-shaped sign may be interpreted as a warning of road hazards; a triangular sign may be interpreted as a yield sign; a circular sign may be interpreted as a railroad crossing; an octagonal sign may be interpreted as being a stop sign, etc. For example, camera 12 may capture an image of the diamond-shaped sign shown in FIG. 2 and sign shape recognition module 14 may interpret the diamond shape of the sign as an indication of a road hazard.

Text recognition module 16 may recognize the letters and numbers printed on the sign in the images captured by the camera and determine therefrom the text message conveyed by the sign. Text recognition module 16 may determine words that would add more clarity to the text message conveyed by the sign, but that may have been omitted from the sign because of limited area available for printing on the sign. For example, text recognition module 16 may determine that the message conveyed by the sign is "speed limit 25 miles per hour", wherein "miles per hour" provides more clarity to the message, but may have been omitted from the sign because there was not enough area on the sign to print these words. Such words may also be omitted from the sign because the words may be easily assumed by a driver who sees the sign. However, such words may be more easily assumed by a driver who sees the sign and its familiar format than by a driver who merely has the literal text of the sign read to him. Thus, it may be advantageous to add such words to the audible message spoken to the driver.

Arrangement 10 may store in memory the speed limit that the vehicle is currently in, which may be determined from previous speed limit signs that have been seen, or from an external database that looks up the speed limit in an external database based on the vehicle's GPS location. Thus, a processor included in arrangement 10 may ascertain whether the posted speed limit represents an increase or a reduction in the immediately preceding speed limit.

Sign color and symbol recognition module 18 may recognize the color of the sign and symbols on the sign in the images captured by the camera and determine therefrom the type of sign it is and the information that the sign is conveying. For example, a yellow sign conveys caution; a black and white sign conveys regulations; an orange sign conveys a road construction area; a brown sign conveys a recreation area; a blue sign conveys guidance; an arrow symbol indicates a direction that the sign pertains to, or a direction that the road takes ahead; a stick figure of a human walking indicates a cross walk; an X symbol indicates a railroad crossing; and a circle with an angled line through it indicates that whatever is within the circle is prohibited, etc. For example, camera 12 may capture an image of the sign with the arrow symbol shown in FIG. 2 and determine that the color of the sign outside of the arrow and speed limit rectangle is orange, indicating road construction, and the arrow indicates a straight-ahead direction. Putting these two elements together, sign color and symbol recognition module 18 may determine that the sign indicates road construction is taking place on the road ahead.

Text synthesization module 20 receives all of the outputs of sign shape recognition module 14, text recognition module 16, and sign color and symbol recognition module 18 and synthesizes a text message that conveys the total or overall message conveyed by the sign. For example, given the outputs of sign shape recognition module 14, text recognition module 16, and sign color and symbol recognition module 18 in response to camera 12 capturing images of the sign of FIG. 2, text synthesization module 20 may produce a textual message, such as "construction zone ahead; speed is reduced to 25 miles per hour".

Text translation module 22 may receive the output of text synthesization module 20 and may translate the output into the language of the driver's choice. This may be particularly advantageous when the driver is driving in an area where signs are not in his native language. If the output of text synthesization module 20 is already in the driver's native language, then text translation module 22 may pass the output of text translation module 22 without change to text-to-speech module 24.

Text-to-speech module 24 may convert the text output of text translation module 22 into a synthesized speech signal or a pre-recorded speech signal. The signal may then drive a loudspeaker (not shown) to produce audible speech that the driver can hear.

Figure 3:
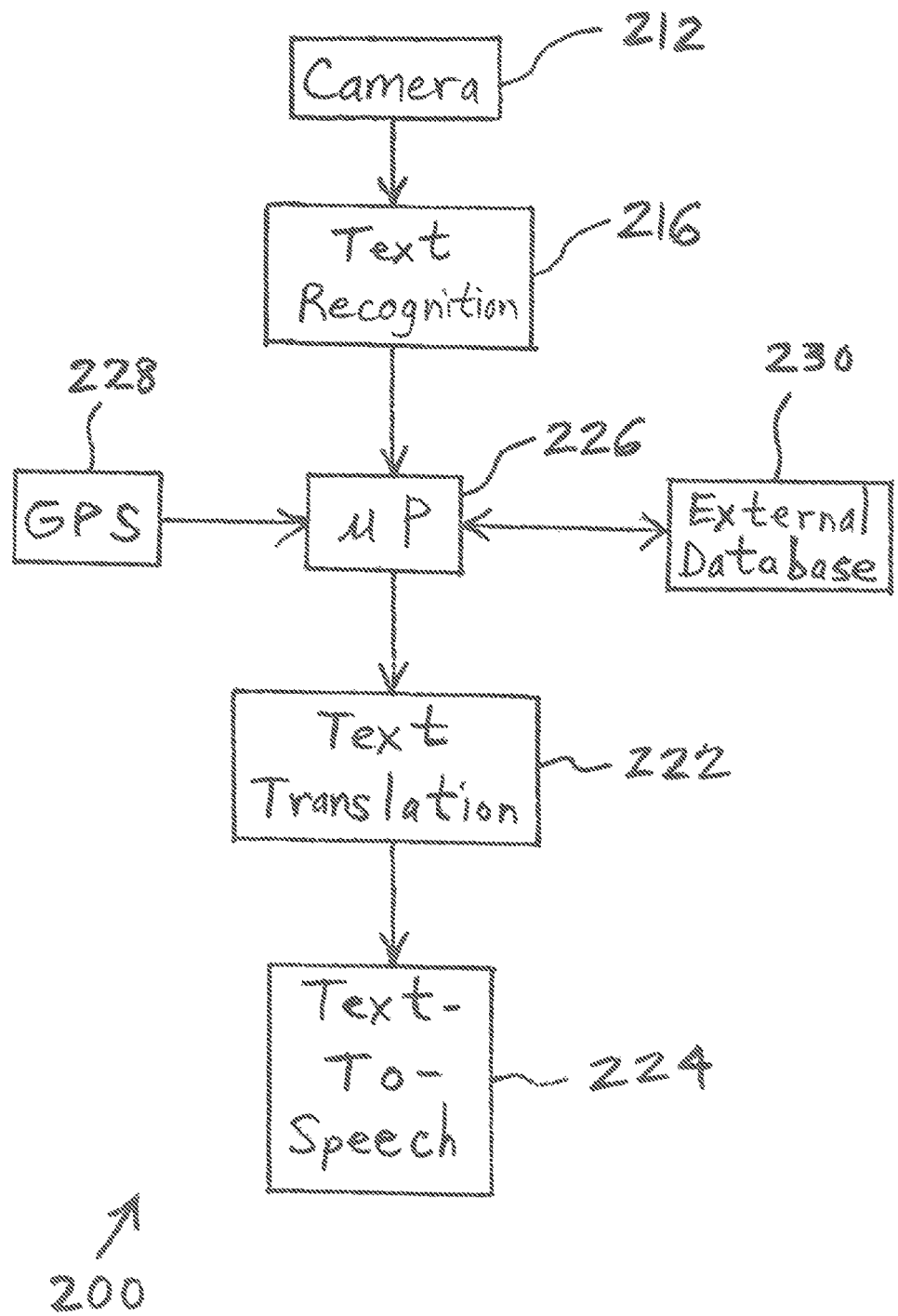
FIG. 3 is a block diagram of another embodiment of a road sign announcing arrangement of the present invention.

Another embodiment of a road sign announcing arrangement 200 of the present invention is shown in FIG. 3. Arrangement 200 includes a camera 212 and a text recognition module 216 which may be substantially similar to camera 12 and text recognition module 16 of FIG. 1, and thus are not described in detail herein.

The output of text recognition module 216 may be received by an electronic processor 226, which also receives vehicle location information from an in-vehicle GPS module 228. Processor 226 is also in bi-directional wireless communication with an external database 230 of sign messages stored in association with geographical locations. Processor 226 may forward the vehicle location information along with vehicle traveling direction information, which may be derived from the changes in vehicle location, to database 230. Database 230 may interpret this information as a query as to what message is conveyed by a sign that may be visible to the driver. Database 230 may respond to the query by transmitting to processor 226 both the literal word-for-word message on the visible sign and a longer textual interpretation of the sign that is more easily understood in audio form than is the literal word-for-word message. For example, in the case of the sign of FIG. 2, database 230 may transmit to processor 226 both "speed limit 25" and "construction zone ahead; speed is reduced to 25 miles per hour".

Processor 226 may compare the output of text recognition module 216 to the literal word-for-word message as provided by database 230. Processor 226 may then, based on the comparison, produce a confidence score indicating the degree of confidence that the word-for-word message as provided by database 230 is the same text that is on the sign in the images captured by camera 212 (i.e., as indicated by the output of text recognition module 216). In general, the greater the percentage of words and/or letters in the word-for-word message as provided by database 230 that match the output of text recognition module 216, the greater the confidence score.

If the confidence score equals or exceeds a threshold, then processor 226 may transmit the longer textual interpretation of the sign received from database 230 to text translation module 222 for translation to the driver's chosen or native language. Conversely, if the confidence score is less than the threshold, then processor 226 may transmit the output of text recognition module 216 to text translation module 222 for translation to the driver's chosen or native language. In either case, text-to-speech module 224 may present the audible translation to the driver.

In another embodiment, the features of arrangements 10 and 200 are combined. If the confidence score is less than the threshold, then processor 226 may forward the output of text synthesization module 20 to text translation module 222.

In yet another embodiment, database 230 provides only the literal word-for-word message on the visible sign to processor 226. If the confidence score is at least as high as the threshold, then processor 226 may then transmit to text translation module 222 the word-for-word message as provided by database 230 or may transmit the output of text recognition module 216 to text translation module 222. Alternatively, in the embodiment which combines the features of arrangements 10 and 200, then processor 226 may forward the output of text synthesization module 20 to text translation module 222.

It is further possible in another embodiment, to eliminate camera 212 and text recognition module 216 from arrangement 200. In this case, processor 226 may simply transmit the output of database 230 to text translation module 230.

In still another embodiment, database 230 provides only the longer textual interpretation of the sign to processor 226. The confidence score may then be based on the degree to which the words and/or letters in the output of text recognition module 216 are present in the longer textual interpretation of the sign from database 230. If the confidence score is at least as high as the threshold, then processor 226 may transmit to text translation module 222 the longer textual interpretation of the sign.

FIGS. 1 and 3 each include a plurality of functional blocks or modules. It is to be understood that these modules may all be considered processing devices and may be incorporated in individual electronic processors, in a common single processor, or in some intermediate number of processors.

In one embodiment, the confidence threshold is adjustable by the driver such that he may receive and hear more or fewer textual messages from the external database. This may be particularly advantageous when a road sign is no longer readable, or when the camera is not in working condition, such as due to the presence of snow or dust, etc.

Figure 4:
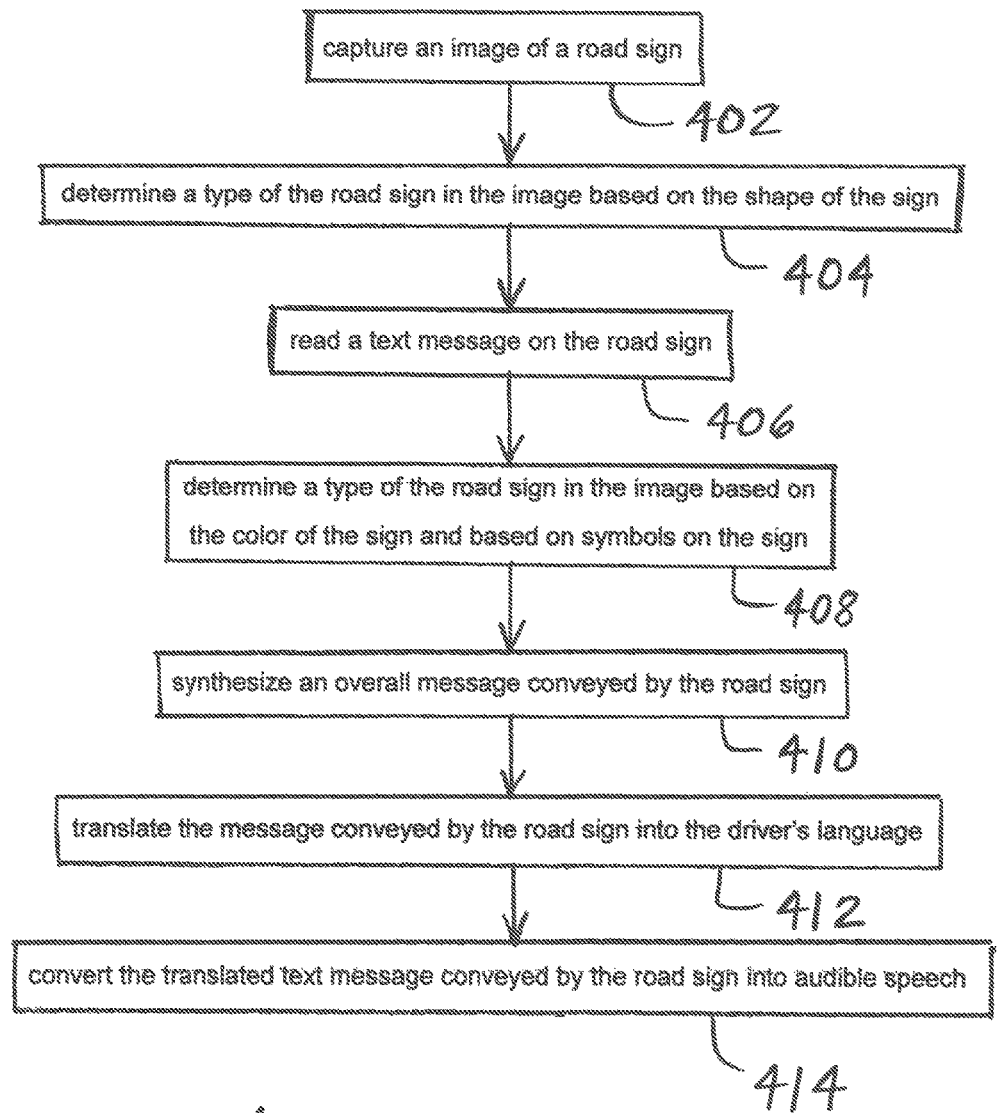
FIG. 4 is a flow chart of one embodiment of a road sign announcing method of the present invention.

FIG. 4 illustrates one embodiment of a road sign announcing method 400 of the present invention. In a first step 402, an image of a road sign is captured. For example, camera 12 may capture images of road signs within its field of view along the roadside and/or above the road that the vehicle is traveling on.

Next, in step 404, the type of the sign in the image is determined based on the shape of the sign. That is, sign shape recognition module 14 may recognize the shape of the sign in the image captured by the camera and determine therefrom the type of sign it is. For example, an isosceles triangle or pennant-shaped sign may be interpreted as a no passing sign.

In a next step 406, a text message on the sign is read. For example, text recognition module 16 may recognize the letters and numbers printed on the sign in the image captured by the camera and determine therefrom the text message conveyed by the sign.

In step 408, the type of the sign in the image is determined based on the color of the sign and based on symbols on the sign. That is, sign color and symbol recognition module 18 may recognize the color of the sign and symbols on the sign in the image captured by the camera and determine therefrom the type of sign it is and the information that the sign is conveying. For example, the yellow color of a no passing sign conveys caution, and a circle with an angled line through it indicates that whatever is within the circle (e.g., the word "passing" is prohibited).

Next, in step 410 an overall message conveyed by the sign is synthesized. For example, text synthesization module 20 receives all of the outputs of sign shape recognition module 14, text recognition module 16, and sign color and symbol recognition module 18 and synthesizes a text message that conveys the total or overall message conveyed by the sign.

In step 412, the message conveyed by the sign is translated into the driver's language. For example, text translation module 22 may receive the output of text synthesization module 20 and may translate the output into the language of the driver's choice.

In a final step 414, the translated text message conveyed by the sign is converted into audible speech. For example, text-to-speech module 24 may convert the text output of text translation module 22 into a synthesized speech signal or a pre-recorded speech signal. The signal may then drive a loudspeaker to produce audible speech that the driver can hear.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A vehicle, comprising:
   a geographical positioning system configured to determine a geographical location of the vehicle;
   a processing device communicatively coupled to the geographical positioning system and configured to:
   wirelessly transmit the geographical location of the vehicle and vehicle traveling direction information to an external database;
   wirelessly receive from the external database a textual message associated with a road sign that is visible to a driver of the vehicle at the geographical location of the vehicle; and
   wirelessly receive from the external database a literal word-for-word recitation of the textual message on the visible road sign;
   a text-to-speech module communicatively coupled to the processing device and configured to convert the textual message from the external database into an electronic speech signal;
   a loudspeaker communicatively coupled to the text-to-speech module and configured to convert the electronic speech signal into audible speech that can be heard by the driver of the vehicle;
   a camera configured to capture an image of the road sign; and
   a text recognition module communicatively coupled to the camera and configured to recognize text characters in the captured image, wherein the processing device is communicatively coupled to the text recognition module and is configured to produce a confidence score based on a comparison of the recognized text characters in the captured image and the literal word-for-word recitation from the database.

2. The vehicle of claim 1 wherein the confidence score is indicative of a likelihood that the literal word-for-word recitation from the database is associated with the road sign in the image captured by the camera.

3. The vehicle of claim 1 wherein the text-to-speech module is configured to convert the textual message from the external database into an electronic speech signal only if the confidence score exceeds a threshold.

4. The vehicle of claim 3 wherein the text-to-speech module is configured to convert the recognized text characters in the captured image into an electronic speech signal only if the confidence score is less than the threshold.

5. A vehicle, comprising:
- a camera configured to capture an image of a road sign associated with a road that the vehicle is traveling on;
- a text recognition module communicatively coupled to the camera and configured to recognize text characters in the captured image;
- a geographical positioning system configured to determine a geographical location of the vehicle;
- a processing device communicatively coupled to the text recognition module and the geographical positioning system and configured to:
  - wirelessly transmit the geographical location of the vehicle, and information indicative of a direction of travel of the vehicle, to an external database;
  - wirelessly receive from the external database a textual message associated with a road sign that is visible to a driver of the vehicle at the geographical location of the vehicle; and
  - produce a confidence score indicative of a likelihood that the textual message from the database is associated with the road sign in the image captured by the camera;
- a text-to-speech module communicatively coupled to the processing device and configured to convert the textual message from the external database into an electronic speech signal only if the confidence score exceeds a threshold; and
- a loudspeaker communicatively coupled to the text-to-speech module and configured to convert the electronic speech signal into audible speech that can be heard by the driver of the vehicle.

6. The vehicle of claim 5 wherein the text-to-speech module is configured to convert the recognized text characters in the captured image into an electronic speech signal only if the confidence score is less than a threshold.

7. The vehicle of claim 5 wherein the confidence score is based on a comparison of the recognized text characters in the captured image to the textual message from the external database.

8. The vehicle of claim 5, wherein the processing device is configured to wirelessly receive from the external database both the textual message and a literal word-for-word recitation of the textual message on the visible road sign.

9. The vehicle of claim 8 wherein the confidence score is based on a comparison of the recognized text characters in the captured image to the literal word-for-word recitation of the textual message from the external database.

* * * * *